Dec. 2, 1930.  H. E. BIRKHOLZ  1,783,181
AUTOMATIC RESISTANCE CONTROLLED AIR AND GAS FILTER
Original Filed Dec. 23, 1927   4 Sheets-Sheet 1
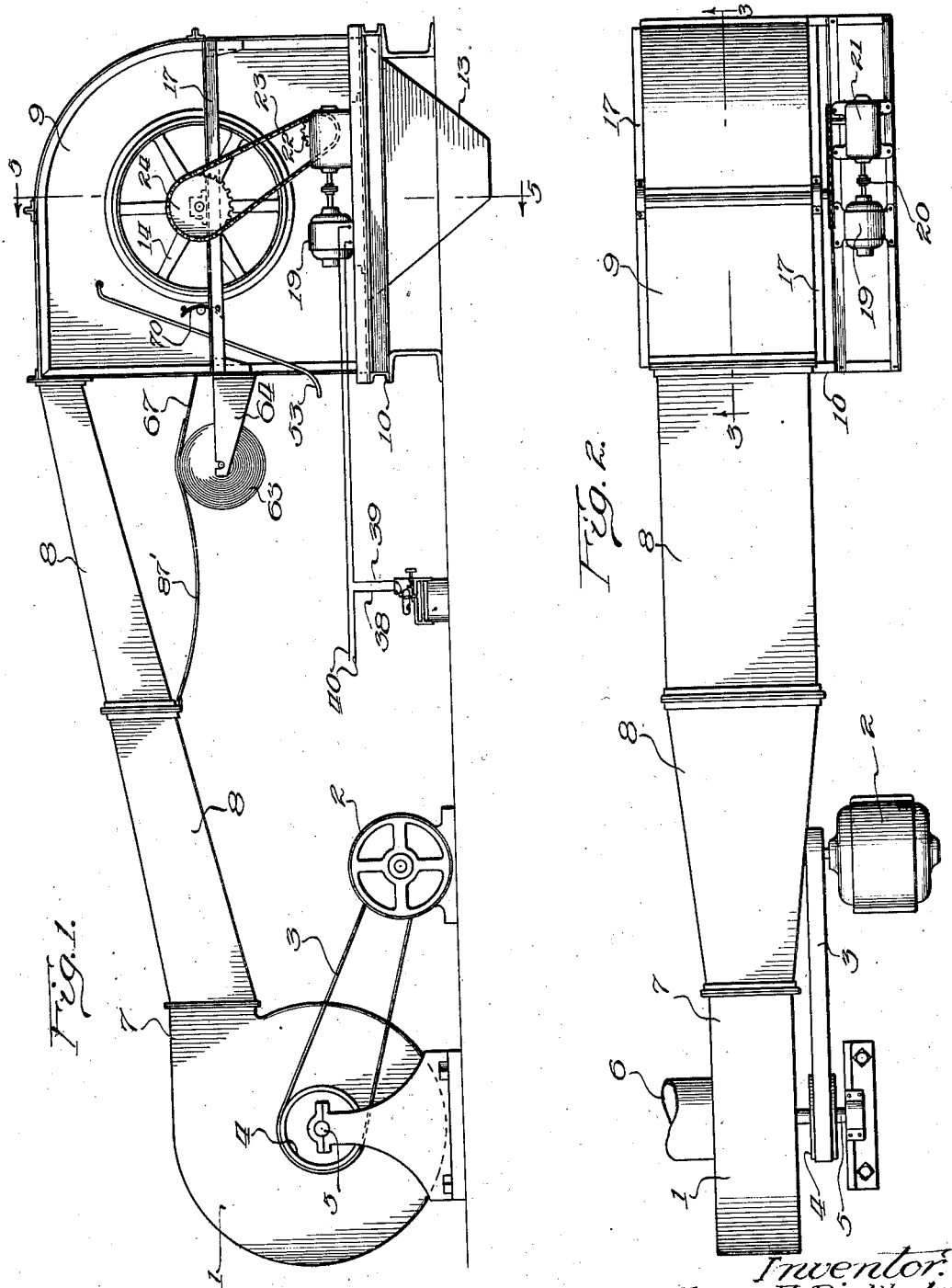

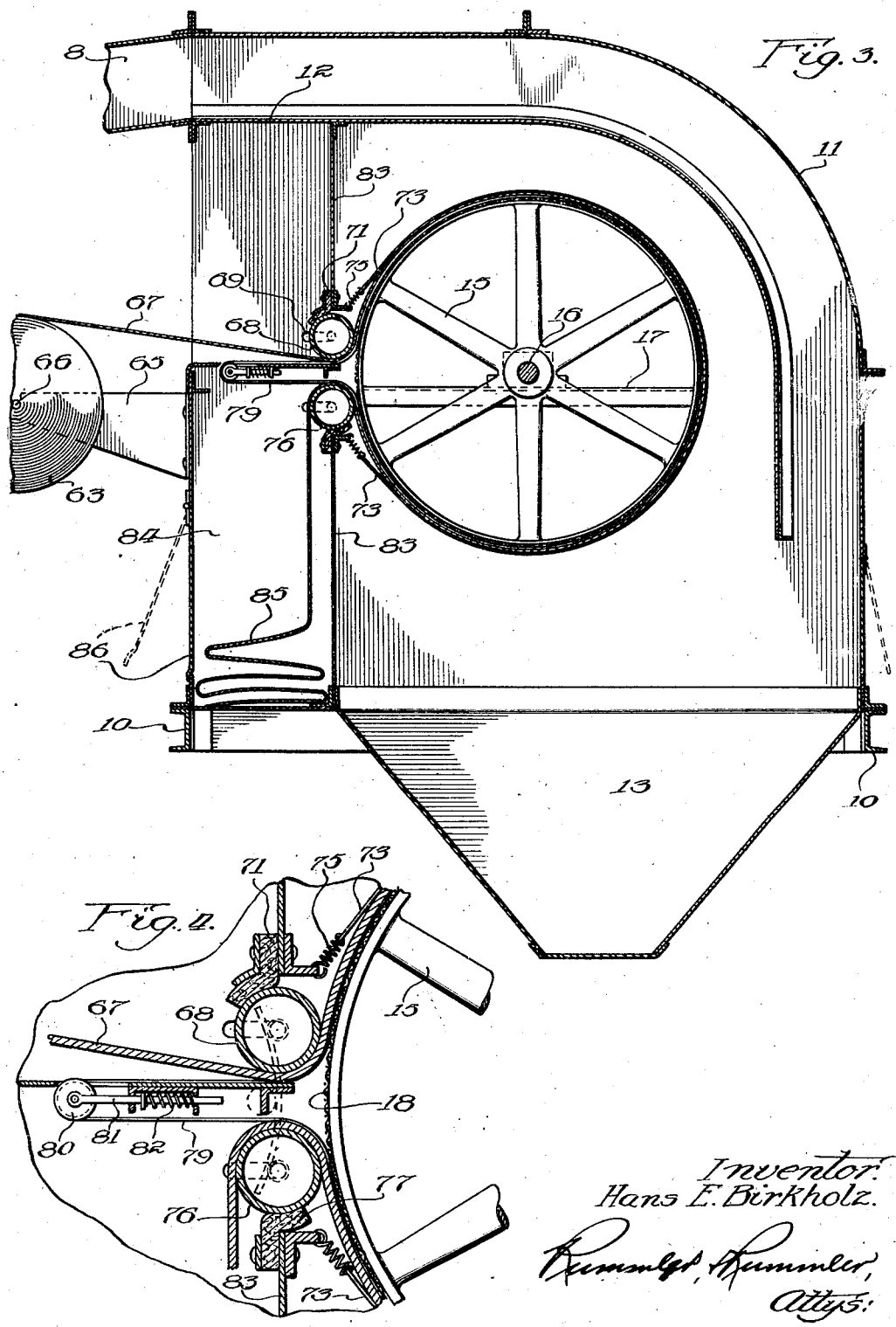

Dec. 2, 1930.     H. E. BIRKHOLZ     1,783,181
AUTOMATIC RESISTANCE CONTROLLED AIR AND GAS FILTER
Original Filed Dec. 23, 1927     4 Sheets-Sheet 3
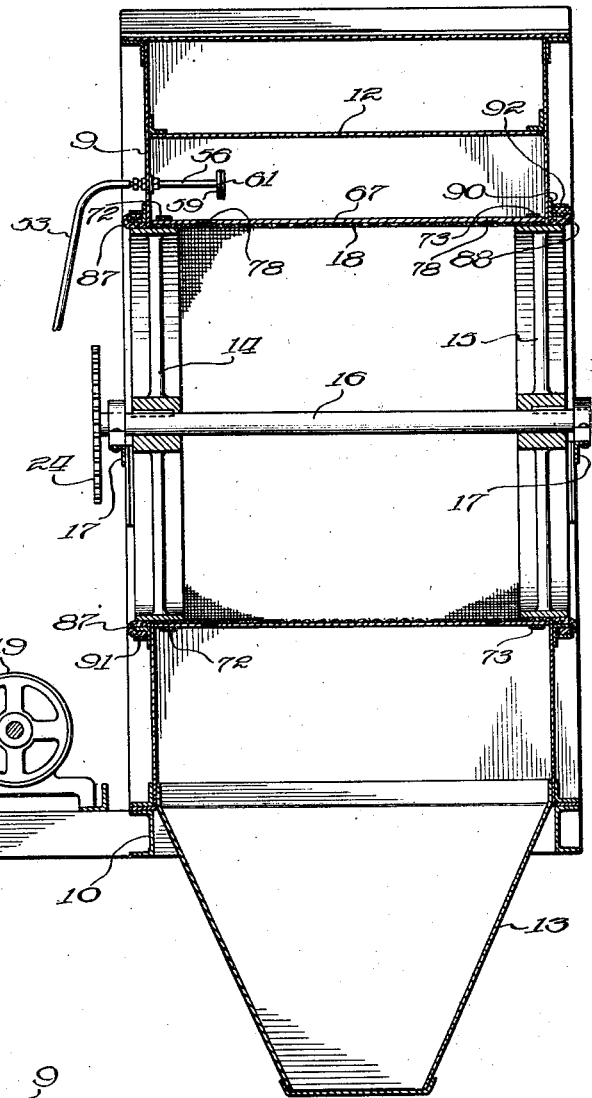
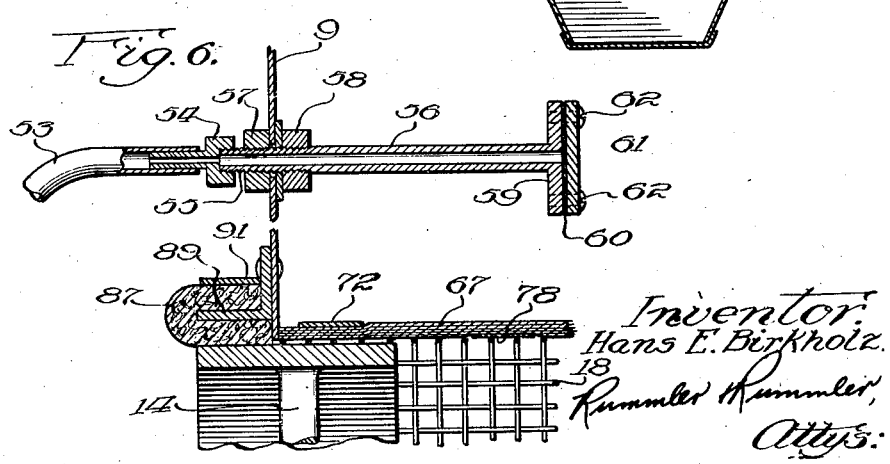
Inventor:
Hans E. Birkholz.
Rummler & Rummler
Attys.

Inventor:
Hans E. Birkholz

Patented Dec. 2, 1930

1,783,181

UNITED STATES PATENT OFFICE

HANS E. BIRKHOLZ, OF CHICAGO, ILLINOIS, ASSIGNOR, BY MESNE ASSIGNMENTS, TO AMERICAN AIR FILTER COMPANY, INC., OF LOUISVILLE, KENTUCKY, A CORPORATION OF DELAWARE

AUTOMATIC RESISTANCE-CONTROLLED AIR AND GAS FILTER

Application filed December 23, 1927, Serial No. 242,080. Renewed May 1, 1930.

This invention relates to air and gas filters of the continuous or automatic type which use as a filtration medium, a web of paper such as that shown by my copending application Serial No. 235,509, filed November 25, 1927.

The main objects of this invention are to provide an automatic filter wherein the filtration medium, after having been used, is discarded and fresh filtration medium is replaced in filtering position; to provide a filter unit which utilizes the cyclone or centrifugal principle for separating the heavy particles of dirt and dust from the air or gas; to provide a filter unit which requires the minimum of attention while in operation; to provide a filter unit having an automatic control which regulates the replacement of the filtering material in accordance with the useful life of the material used for a filtration medium; and to provide a filtration unit in which the cost per thousand cubic feet of air filtered is substantially a fractional part of the cost for such work done with a filter using a metallic filtering medium.

An illustrative embodiment of this invention is shown in the accompanying drawings in which:

Fig. 1 is a side elevation of the complete filtering unit together with a blower for forcing air thereinto.

Fig. 2 is a top plan view of the same.

Fig. 3 is an enlarged section taken on the line 3—3 of Fig. 2.

Fig. 4 is an enlarged fragmentary sectional detail of the rollers which feed the filtering medium to the filtering surface and discharge it therefrom.

Fig. 5 is an enlarged transverse section taken on the line 5—5 of Fig. 1.

Fig. 6 is an enlarged fragmentary sectional detail.

Fig. 9 is an enlarged fragmentary detail of the yielding means for urging the sealing rollers into contact with the filtering drum.

Figure 7:
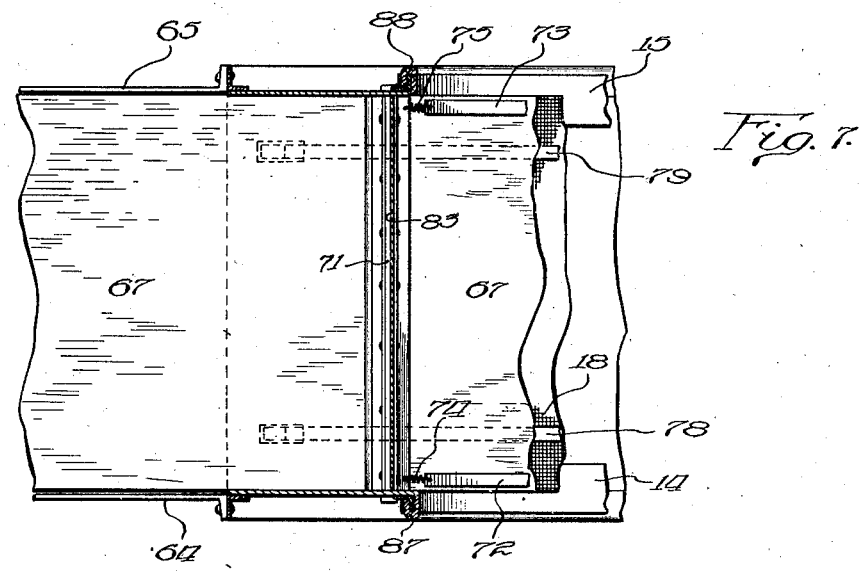
Fig. 7 is an enlarged plan sectional fragmentary detail.

In the construction shown in the drawings, an air blower 1 is driven by an electric motor 2 through a belt 3 which drives a pulley wheel 4 keyed to a shaft 5 of the blower 1. The blower 1 is provided with an air intake 6 and a discharge 7 which communicates with an air duct 8. The air duct 8 communicates with and discharges air into the filter unit 9.

The filter unit comprises a supporting framework 10 which carries an exterior housing 11 preferably of sheet metal. At the point where the air duct 8 comunicates with the housing 11, the filtering unit is provided with an interior partition wall 12 which is spaced away from the exterior housing 11 a distance substantially equal to the vertical dimension of the air duct 8. The partition 12 extends in spaced parallel relationship to the exterior wall 11 and both the housing and partition are curved as shown particularly in Fig. 3 so as to cause the air to change direction of movement after passing into the filter unit to give it a circular motion for separating particles of heavy dirt and dust from the lighter particles. The partition 12 terminates in spaced relation to the bottom of the housing 11 and the bottom of the filter unit is closed by a hopper 13 which receives the heavy particles of dirt and dust separated from the air.

The opposite lateral sides of the filter unit housing are provided with circular openings therein for receiving a cylindrical drum which comprises a pair of relatively light weight cast iron pulley wheels 14 and 15 keyed to a shaft 16 which is journaled on the side bars 17 of the supporting framework 10. Wheels 14 and 15 are in spaced relationship to each other, each wheel being located with its outer surface located partly within the housing 11 and partly without said housing as shown in detail in Fig. 6. A foraminous metal screen 18 of heavy gauge is mounted on that part of the outer peripheral surface of each of the wheels 14 and 15 which extend or are housed inside of the casing 11.

The wheels, shaft and screen thus make a cylindrical drum, the open ends of which communicate with the atmosphere and the peripheral surface of which communicates with the interior of the filter unit so that air blown into said unit passes through the surface of the drum and is discharged out through the open ends thereof into the atmosphere, although it will be understood that the open ends of the drum may be connected up to suitable air ducts for carrying the air to whatever location is desired.

The ends of the cylindrical filtering drum are sealed at the points where the drum rotates in the housing of the filter unit, by annular U-shaped felt gaskets 87 and 88 mounted on suitable supporting flanges 89 and 90 respectively. The flanges 89 and 90 are riveted to the outer faces of the filter unit so as to cause the gaskets to be pressed tightly in contact with those portions of the respective wheels 14 and 15, which protrude beyond the sides of the filter unit. Retaining bands 91 and 92, respectively, are provided for holding the outer fold of the gasket tightly on to the supporting flanges 89 and 90, respectively.

Means are provided for rotating the shaft 16 and thus rotating the cylindrical filtering drum and comprise an electric motor 19 having a flexible coupling 20 on the shaft thereof which drives a gear reduction unit 21. The reduction unit 21 is provided with a suitable sprocket gear 22 which drives a sprocket chain 23 and which passes around and drives a sprocket wheel 24 keyed to one end of the shaft 16.

Means are provided for automatically controlling the filter drive motor 19 and comprises an electric mercury switch 25 having contact terminals 26 and 27 therein. The switch 25 is carried by a bracket 28 pivotally mounted at 29 to a carriage 30 which is slidably mounted on a bar 31 of a frame 32. Movement of the carriage 30 backward or forward on the bar 31 is effected by an adjusting screw 33 threaded through an upstanding lug 34 on frame 32. The inner end of the set screw 33 is swiveled to the carriage 30 and the outer end thereof is provided with a knurled head 35 for rotating the screw. Terminals 26 and 27 are connected through binding posts 36 and 37 to lead wires 38 and 39 respectively, which are in series with the circuit 40 which supplies current to the motor 19 as shown in Fig. 1 of the drawings.

Figure 8:
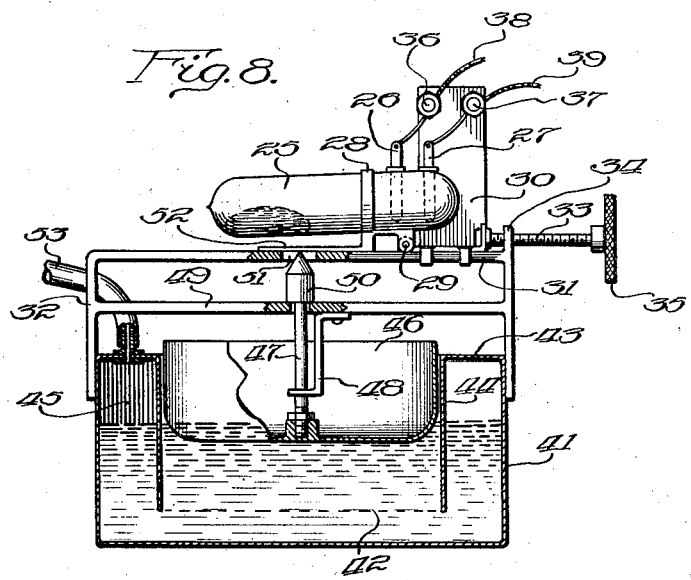
Fig. 8 is an enlarged vertical section of the automatic pressure control switch for the filter driving motor circuit.

Means are provided for moving the switch 25 on its pivot 29 to open and close the circuit and comprise an annular float chamber 41 which contains a quantity of oil 42 or other suitable liquid and which supports the framework 32. The upper peripheral edge of the float chamber 41 has an inwardly turned flange 43 to which is attached a depending cylindrical apron 44 which terminates in spaced relationship to the bottom of the float chamber so that when oil is placed in the float chamber to a height as shown in Fig. 8 of the drawings, an annular air space or chamber 45 is provided. A cup-shaped float 46 of slightly less diameter than the depending apron 44 rides on the surface of the liquid and is provided with an upstanding axially disposed stem 47 which passes through a depending guide bracket 48 fastened to frame 32 and through a cross bar 49 which is located below and in spaced parallel relationship to the bar 31. The upper end of the stem 47 carries an enlarged head 50 which is of greater diameter than the aperture for stem 47 through the bar 49 so as to support the float chamber under certain conditions. The bar 31 is provided with an opening 51 therethrough of slightly larger diameter than the head 50 so that when said float and stem is raised, the head 50 will pass through the opening 51 and raise upwardly an arm 52 formed integrally with the bracket 28.

The height of the liquid in that part of the float chamber which carries the float 46 may be varied by increasing or decreasing the air pressure in the annularly enclosed space 45 and means for effecting such variation comprises a tube 53, one end of which communicates with the chamber 45 as shown in Fig. 8 and the other end of which communicates with the interior of the filter chamber as shown in Figs. 1, 5 and 6. The upper end of tube 53 as shown in Fig. 6 of the drawings is slipped over the reduced end of a threaded fitting 54 which screws onto the outer threaded end 55 of a tube 56. The tube 56 is mounted by nuts 57 and 58 in the housing 11 of the filter unit. The inner end of the tube 56 has an enlarged head 59 thereon, the face of which is covered with a wire screen 60 held thereagainst by a disc 61 secured by screws 62 to the face of the annular head 59.

The filter material used in this filter unit is preferably paper such as that shown in my heretofore mentioned co-pending application for patent and means are provided for mounting a roll 63 of such filtering paper adjacent the filtering unit and comprise a pair of brackets 64 and 65 mounted on the housing 11. These brackets support a rod 66 adjacent their outer ends upon which a roll of paper 63 is carried. A web 67 of filter paper is passed from the roll 63 into the filter unit around the drum so as to cover the peripheral surface thereof and be supported thereon and means are provided for sealing the point of entrance with respect to the interior of the filter unit and comprise a roller 68 journaled in slots 69 formed in the side walls of the filter unit. Said roller is pressed against the peripheral surface of the filtering drum by the upper end of a spring 70 shown in Fig. 1 which bears against the trunnion of of said roller to urge it toward the filtering drum. A felt gasket 71 is mounted along the top side of said roller to seal the connection between the interior of the drum and said roller at this point.

Means are provided for snugly holding the web of paper to the outer peripheral surface of the filtering drum and comprise a pair of ribbon-like metallic bands 72 and 73, held by coil tension springs 74 and 75 respectively at their opposite ends, said springs being attached to suitable brackets riveted to the interior wall of the filter unit. The bands 72 and 73 are spaced closely adjacent the respective ends of the filtering drum so as to bear down on the supporting screen 18 at a point where the screen is on the outer peripheral surface of the wheels 14 and 15 as shown particularly in Figs. 5 and 6 of the drawings. After the web 67 of filter paper is passed around the filtering drum, it passes partly around another roller 76 which is identical to the roller 68 and which is likewise pressed against the outer peripheral surface of the filtering drum by the lower end of spring 70 which presses against the respective trunnions of said roller. The roller 76 is likewise sealed with respect to the interior of the filtering unit by a felt gasket 77.

Means are provided for positively peeling the paper off of the peripheral surface of the filter drum and comprise a pair of endless tapes 78 and 79 which pass around the outer peripheral surface of the drum underneath the filter web 67 and around a tension roller 80 shown particularly in Figs. 3 and 4 of the drawings. The roller 80 is mounted at each end on a pair of arms 81 slidably mounted in depending flanges of an inverted channel and normally urged outwardly to keep tension on the tapes 78 and 79 by compression springs 82.

As shown in Fig. 3 of the drawings, the interior of the filter unit is provided with an upstanding wall 83, the upper end of which terminates closely adjacent to the roller 76 and provides a compartment 84 into which the used paper filtering medium is discharged as shown at 85. Compartment 84 is provided with a door 86 hinged to the housing for giving access to the compartment 84 so that used filter material may be removed therefrom at suitable intervals.

A slight tension is maintained on the roll of filter paper 63 by a strip of heavy cloth 87', one end of which is attached to the air duct 8, and the other end of which lies on the roll 63 so as to act as a drag.

In the operation of this improved filtering unit, the ends of the filtering drum may be attached to a source of suction to draw air through the filtering unit, or the intake of the filter unit may be connected as shown in the drawings to the blower 1. In the installation as shown, a blower 1 drives air through the air duct 8 into the filter unit wherein the air is caused to circle around the filter drum and thus by centrifugal action, separate the heavy particles of dirt and dust into the air, which particles fall into the hopper 13. Finer and lighter particles of dirt and dust which are retained in suspension in the air are separated as the air passes through the web of paper filter material which covers the peripheral surface of the filter drum.

The mercury float controlled switch is adjusted and regulated so that when the paper filtering material is filled with dirt and dust to a point where its useful life is ended and where it presents an objectionable resistance to the passage of air therethrough, the increased pressure of the air in the filter unit is communicated to the annular space 45 of the float chamber 41. Such increased pressure forces the liquid down in said annular space and up in the central space wherein the float 46 is carried, thus raising the float 46, stem 47 and head 50 against the arm 52 of the electric mercury switch sufficiently to rock the outer end of the switch and cause the mercury to close the circuit through the terminals 26 and 27.

Closing of the circuit at this point completes a circuit through the filter operating drive motor 19. The motor 19, through its reduction gearing and sprocket chain connection to the filtering cylinder rotates the cylinder so as to draw on fresh filtering paper from the roll 63 and discharge the used filtering paper into the compartment 84. Movement of the filtering drum continues until the pressure in the filtering unit is relieved by reason of the fresh filtering material being brought into filtering position, at which time the pressure is also relieved in the automatic mercury switch, which then resumes its open position, thus stopping the drive motor 19. The drag 87 which rests on top of the roll 63 maintains a slight tension on the web 67 of filter paper so that the paper is fed evenly and smoothly on to the filtering drum when it is rotated.

Although but one specific embodiment of this invention has been herein shown and described, it will be understood that details of the construction shown may be altered or omitted without departing from the spirit of this invention as defined by the following claim.

I claim:

1. An air and gas filter comprising the combination of a framework, a filtration medium movably mounted on said framework, means for confining a flow of air through said filtration medium, and automatic means controlled by the resistance of said filtration medium to the flow of air therethrough for moving said filtration medium to bring fresh medium into filtering position and moving the used medium out of filtering position.

2. An air and gas filter comprising the combination of a frame work, an endless foraminous supporting surface movably mounted on said framework, a fibrous filtration medium carried on said supporting surface, means for confining a flow of air through said filtration medium, means for moving said supporting surface and filtration medium for bringing fresh medium into filtering position and discarding the used medium, and means controlled by the resistance of said filtration medium to the flow of air therethrough for governing the movement of said supporting surface.

3. An air and gas filter comprising the combination of a framework, a housing on said frame-work, a hopper communicating with and located at the lower part of said housing, an air duct communicating with said housing and circling partly around the interior thereof whereby heavy particles of dirt are separated from the air and deposited in said hopper, a drum journaled in said housing, said drum having a foraminous peripheral supporting surface communicating with the interior of said housing, one end of said drum being open to the atmosphere, a web of filtering paper covering the surface of said drum, and means for rotating said drum to bring fresh paper into position thereon and discharging used paper.

4. An air and gas filter comprising the combination of a framework, a housing on said framework, a hopper communicating with and located at the lower part of said housing, an air duct communicating with said housing and circling partly around the interior thereof whereby heavy particles of dirt are separated from the air and deposited in said hopper, a drum journaled in said housing, said drum having a foraminous peripheral supporting surface communicating with the interior of said housing, one end of said drum being open to the atmosphere, a web of filtering paper covering the surface of said drum, and means automatically controlled by the resistance of said filtering paper to the passage of air therethrough for rotating said drum to bring fresh paper into position thereon and discharging used paper.

5. An air and gas filter comprising the combination of a housing, a drum journaled in said housing, a web of filtering paper supported on said drum, means for inducing a flow of air through said filtering paper comprising an air duct communicating with said housing and circling partly around the interior thereof thereby separating heavy particles form the air and means for rotating said drum whereby fresh filtering paper is brought into position on said drum and used filtering paper is discharged from position thereon.

6. An air and gas filter comprising the combination of a housing, a drum journaled in said housing, a web of filtering paper supported on said drum, means for inducing a flow of air through said filtering paper and means automatically controlled by the resistance of said filtering paper to the passage of air therethrough for rotating said drum whereby fresh filtering paper is brought into position on said drum and used filtering paper is discharged from position thereon.

7. An air and gas filter comprising the combination of a housing, a drum journaled in said housing, a pair of sealing rollers journaled on said housing, yielding means for urging said rollers against the peripheral surface of said drum, a web of filtering paper passing between one of said rollers and said drum, said web being wound around said drum and passing out between the other of said rollers and the surface of said drum, means for inducing a flow of air through the filtering paper in position on said drum and means for rotating said drum whereby fresh filtering paper is brought into position on said drum and used filtering paper is discharged from position thereon.

8. An air and gas filter comprising the combination of a housing, a drum journaled in said housing, a pair of sealing rollers journaled on said housing, yielding means for urging said rollers against the peripheral surface of said drum, a web of filtering paper passing between one of said rollers and said drum, said web being wound around said drum and passing out between the other of said rollers and the surface of said drum, means for inducing a flow of air through the filtering paper in position on said drum and means automatically controlled by the resistance of said filtering paper to the passage of air therethrough for rotating said drum whereby fresh filtering paper is brought into position on said drum and used filtering paper is discharged from position thereon.

9. An air and gas filter comprising the combination of a housing, a drum journaled in said housing, a web of filtering paper supported on said drum, means for inducing a flow of air through said filtering paper, an electric motor for rotating said drum, whereby fresh filtering paper is brought into position on said drum and used filtering paper is discharged from position thereon, and an electric switch operated by the resistance of said filtering paper to the passage of air therethrough for controlling said motor.

Signed at Chicago this 20th day of December, 1927.

HANS E. BIRKHOLZ.